United States Patent
Xu

(10) Patent No.: US 10,768,041 B2
(45) Date of Patent: Sep. 8, 2020

(54) WEIGHING SCALE

(71) Applicant: Xinqiang Xu, Shenzhen (CN)

(72) Inventor: Xinqiang Xu, Shenzhen (CN)

( * ) Notice: Subject to any disclaimer, the term of this patent is extended or adjusted under 35 U.S.C. 154(b) by 104 days.

(21) Appl. No.: 16/226,546

(22) Filed: Dec. 19, 2018

(65) Prior Publication Data

US 2019/0331521 A1 Oct. 31, 2019

(30) Foreign Application Priority Data

Apr. 27, 2018 (CN) .................... 2018 2 0615575 U
Jul. 27, 2018 (CN) .......................... 2018 1 0847164
Jul. 27, 2018 (CN) .................... 2018 2 1214355 U

(51) Int. Cl.
*G01G 23/37* (2006.01)
*G01G 19/50* (2006.01)

(52) U.S. Cl.
CPC ......... *G01G 19/50* (2013.01); *G01G 23/3721* (2013.01); *G01G 23/3742* (2013.01)

(58) Field of Classification Search
CPC ............... G01G 23/3735; G01G 19/50; G01G 23/3742; G01G 23/3721
USPC ........................................................ 177/245
See application file for complete search history.

(56) References Cited

U.S. PATENT DOCUMENTS

| 6,038,465 A | 3/2000 | Melton |
| 2005/0155246 A1 | 7/2005 | Montagnino |
| 2014/0083779 A1* | 3/2014 | Sharma .................. G01G 19/44 177/1 |
| 2016/0018255 A1* | 1/2016 | Fang .................. G01G 23/3735 177/25.13 |
| 2016/0033319 A1* | 2/2016 | Kovacs ................ A61B 5/7445 177/25.13 |
| 2016/0116327 A1* | 4/2016 | McCaskill ............. G01G 21/22 177/1 |

FOREIGN PATENT DOCUMENTS

| CN | 102466514 | * | 5/2012 |
| CN | 204963989 | * | 1/2016 |
| CN | 205506182 | * | 4/2016 |

(Continued)

OTHER PUBLICATIONS

European Search Report dated Jul. 17, 2019 in the corresponding EP application (application No. 19150302.8).

*Primary Examiner* — Jacques M Saint Surin
(74) *Attorney, Agent, or Firm* — Kilpatrick Townsend & Stockton, LLP

(57) ABSTRACT

A weighing scale includes a scale body and a detecting board. The scale body includes a platform in contact with feet of a subject, a weighing mechanism, a signal processor, a wireless communication device, and a display screen. The detecting board is separated from the scale body and can abut against a top head of the subject and can move towards or away from the platform. At least one of the scale body and the detecting board includes a signal emitter, and at least one of the scale body and the detecting board includes a signal receiver. The signal emitter and the signal receiver measure a distance between the platform and the detecting board. The signal processor processes data of the signal emitter, the signal receiver, and the weighing mechanism, transmits processed data to the display screen and an external mobile device or server.

8 Claims, 4 Drawing Sheets

(56) References Cited

FOREIGN PATENT DOCUMENTS

| | | | |
|---|---|---|---|
| CN | 205317332 | * | 6/2016 |
| CN | 205317332 U | | 6/2016 |
| CN | 105973412 | * | 9/2016 |
| CN | 205597892 U | | 9/2016 |
| CN | 106441534 | * | 2/2017 |
| CN | 206787695 U | * | 12/2017 |
| CN | 206787699 U | * | 12/2017 |
| EP | 1514513 A1 | | 3/2005 |
| JP | H04364426 A | | 12/1992 |
| JP | H11128197 A | | 5/1999 |
| JP | 3157284 U | | 2/2010 |
| JP | 2012192086 A | | 10/2012 |

* cited by examiner

WEIGHING SCALE

CROSS-REFERENCES TO RELATED APPLICATIONS

This application claims priority to Chinese Patent Application No. 2018206155758, entitled "WEIGHING SCALE" filed Apr. 27, 2018, Chinese Patent Application No. 2018108471646, entitled "WEIGHING SCALE" filed Jul. 27, 2018, Chinese Patent Application No. 2018212143550, entitled "WEIGHING SCALE" filed Jul. 27, 2018, the contents of which are expressly incorporated herein by reference in its entirety.

FILED

The present disclosure relates to weight measurement technologies, and more particularly relates to a weighing scale.

BACKGROUND

A conventional weight scale usually can merely measure a body weight. When a user wants to measure a height thereof, the height can only be measured manually by mechanical means (such as a tape measure). Measuring data of the mechanical means is not accurate and is not intuitive for the user to view. And a measuring result thereof can be greatly affected by human factors. In addition, the user needs to manually record the measuring result, which makes the measurement time-consuming and labor-intensive.

SUMMARY

According to various embodiments of the present disclosure, a weighing scale is provided.

A weighing scale includes a scale body and a detecting board. The scale body includes a platform in contact with feet of a subject. The detecting board is separated from the scale body and is used to abut against a top head of the subject. The detecting board can move towards or away from the platform. At least one of the scale body and the detecting board is provided with a signal emitter, and at least one of the scale body and the detecting board is provided with a signal receiver. The signal emitter and the signal receiver are used to measure a distance between the platform and the detecting board. The scale body further includes a weighing mechanism, a signal processor, a wireless communication device, and a display screen. The wireless communication device is used to interact with an external mobile device or server via a wireless network. The signal processor is used to process data of the signal emitter, the signal receiver, and the weighing mechanism, transmit processed data to the display screen for display, and transmit the processed data to the external mobile device or server via the wireless communication device.

A weighing scale includes a scale body and a detecting board. The scale body includes a platform in contact with feet of a subject. The scale body is provided with a signal emitter and a signal receiver. The detecting board is separated from the scale body and is used to abut against a top head of the subject. The detecting board can move towards or away from the platform. The detecting board, the signal emitter, and the signal receiver cooperatively measure a distance between the platform and the detecting board. The scale body further includes a weighing mechanism, a signal processor, a wireless communication device, and a display screen. The wireless communication device is used to interact with an external mobile device or server via a wireless network. The signal processor is electrically connected to the weighing mechanism, the signal emitter, the signal receiver, the wireless communication device, and the display screen. The signal processor is used to process data of the signal emitter, the signal receiver, and the weighing mechanism, transmit processed data to the display screen for display, and transmit the processed data to the external mobile device or server via the wireless communication device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE INVENTION

Reference will now be made to the drawings to describe, in detail, embodiments of the present camera module. It should be noted that references to "an" or "one" embodiment in this disclosure are not necessarily to the same embodiment, and such references mean at least one.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein", "above", "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
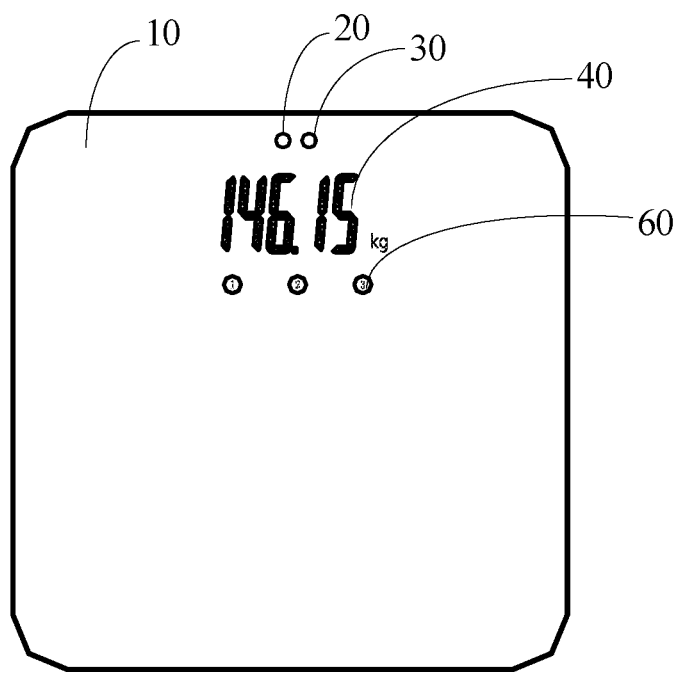
FIG. 1 is an enlarged top view of a scale body of a weighing scale in accordance with a first embodiment.
Figure 2:
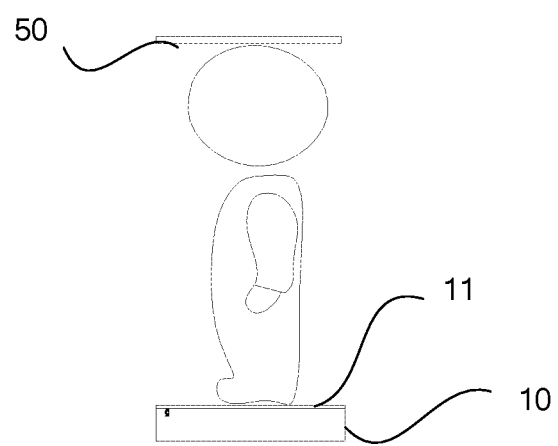
FIG. 2 is a schematic view of the weighing scale of FIG. 1 in a using status.
Figure 3:
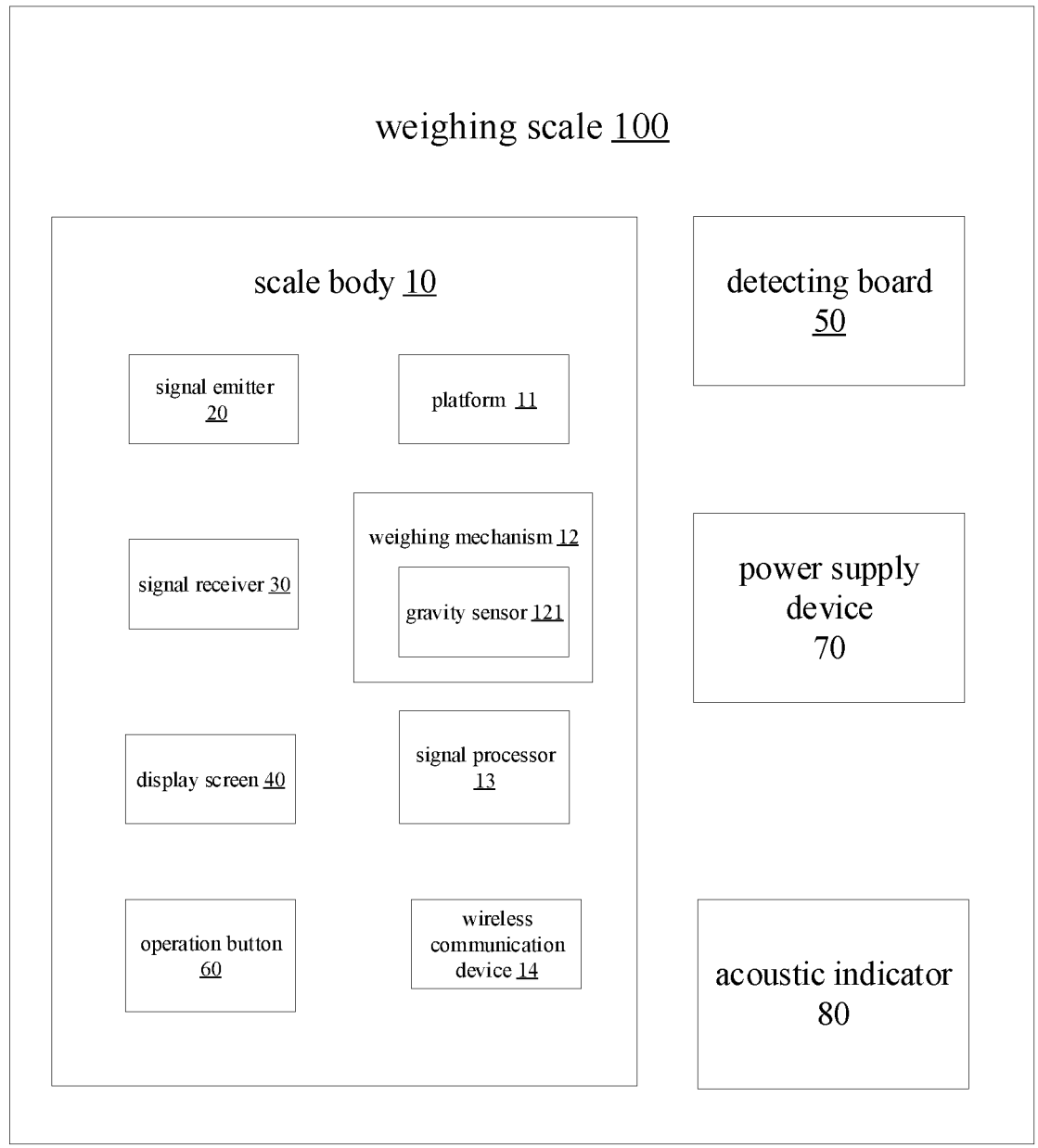
FIG. 3 is a block diagram of a weighing scale of FIG. 2.

Referring to FIGS. 1 to 3, a weighing scale 100 according to a first embodiment is provided. In this embodiment, the weighing scale 100 includes a scale body 10 and a detecting board 50.

The scale body 10 includes a platform 11, a weighing mechanism 12, a signal processor 13, a signal emitter 20, a signal receiver 30, a wireless communication device 14, and a display screen 40.

The platform 11 can be in contact with feet of a subject, such as an adult, a child, or an infant.

The weighing mechanism 12 is used to weigh a weight of the subject. In one embodiment, the weighing mechanism 12 includes a gravity sensor 121, which is used to measure a weight of the subject.

The signal emitter 20 is used to emit a signal for measuring a height of the subject. The signal emitter 20 can be at least one selected from a group consisting of a laser emitter, an LED emitter, an infrared emitter, an ultrasonic transmitter, an electromagnetic wave transmitter, and a millimeter wave transmitter.

The signal receiver 30 is used to receive the height measuring signal reflected by the detecting board 50.

The signal processor 13 is electrically connected to the signal emitter 20, the signal receiver 30, the weighing mechanism 12, the wireless communication device 14, and the display screen 40, respectively. The signal processor 13 can be a microprocessor, or other chips that can implement data processing, etc. The signal processor 13 processes data transmitted from the signal emitter 20 and the signal receiver 30 to obtain height data of the subject, processes data transmitted by the weighing mechanism 12 to obtain weight data of the subject, and transmits the height data and the weight data to the display screen 40.

The wireless communication device 14 is used to interact with an external mobile or server via a wireless network. The wireless communication device 14 can be at least one selected from a group consisting of a WiFi device, a Bluetooth device, a ZigBee device, a Zwave device, a WLAN device, a GSM device, a 2G device, a 3G device, a 4G device, and a 5G devices. The signal processor 13 further transmits the height data and the weight data to the external mobile device or server via the wireless communication device 14. The external mobile device or server can store the height data and the weight data, or display a constitutional index of the subject via a certain manner (such as curve diagram, etc.), thereby establishing a relatively comprehensive human health index of the subject and making it convenient for users to have an intuitive understanding of the constitutional index of the subject.

The display screen 40 receives and displays the processed height and weight data transmitted from the processor 13. The display screen 40 can be an LCD or a digital display screen.

The detecting board 50 is separated from the scale body 10 and is used to abut against a top head of the subject. The detecting board 50 can be moved towards or away from the platform 11. When abutting against the top head of the subject, the detecting board 50 can reflect the height measuring signal transmitted from the signal emitter 20 to the signal receiver 30. The detecting board 50 can be any planar board that can achieve a signal reflection, such as a plastic plate or even a cell phone.

When measuring, the subject steps on the platform 11 and holds the detecting board 50 on the top head thereof. The signal emitter 20 transmits the height measuring signal towards the detecting board 50. The height measuring signal is reflected by the detecting board 50 and is received by the signal receiver 30, thereby achieving the height measuring of the subject.

The aforementioned weighing scale 100 includes the scale body 10 and the detecting board 50 separated from the scale body 10. The scale body 10 includes the signal emitter 20, the signal receiver 30, the weighing mechanism 12, the signal processor 13, the wireless communication device 14, and the display screen 40. The signal emitter 20 transmits the height measuring signal. The height measuring signal is received by the signal receiver 30 after being reflected by the detecting board 50. A measured distance between the platform 11 and the detecting board 50 is actually the height of the subject. The signal processor 13 is electrically connected to the signal emitter 20, the signal receiver 30, the weighing mechanism 13, the wireless communication device 14 and the display screen 40, respectively. The signal processor 13 processes the data of the signal emitter 20, the signal receiver 30, the weighing mechanism 12, and transmits the processed data to the display screen 40 for display. The wireless communication device 14 interacts with the external mobile device or server via the wireless network, and the signal processor 13 further transmits the processed data to the external mobile device or server via the wireless communication device 14. In this way, an accurate weight and height data of the subject can be obtain via the processing of the signal processor on the received signal, which avoids manually height measurement via mechanical means, and ensures an accuracy of a measuring result. The measuring result can be visually displayed on the display screen and can be transmitted to the external mobile device or server for storage via the wireless communication device, thereby avoiding manually record of the measuring result, which saves time and labor, and is convenient and practical.

In this embodiment, the weighing scale 100 further includes a power supply device 70. The power supply device 70 is used to supply power to the weighing scale 100. The power supply device 70 can be a battery or other rechargeable device. In one embodiment, the power supply device can convert an external alternating current into a direct current to supply power to the weighing scale 100.

In this embodiment, the weighing scale 100 further includes an acoustic indicator 80 electrically connected to the signal processor 13. The acoustic indicator 80 is used to broadcast the measuring results transmitted by the signal processor 13 in voice.

In this embodiment, the scale body 10 can be further provided with operation buttons 60. The operation buttons 60 and the display screen 40 are both located on the platform 11. The operation buttons 60 are located at one side of the displaying screen 40. The operation buttons can be at least one selected from a group consisting of a lock button, an acoustic indicating button, a wireless transmission button, a power button, and a height display button. The lock button is used to prevent a displayed weight value from being affected by the shake of the subject on the weighing scale 100. When the subject presses the lock button, the displayed weight value thereof are no longer changed. The acoustic indicating button is used to provide a choice for the subject about whether broadcasting the measured results (the height, and the weight, etc.) thereof in voice or not. When the acoustic indicating button is pressed, the weighing scale 100 broadcasts the measuring results invoice, otherwise the acoustic indication is not performed. The wireless transmission button is used to provide a choice for the subject about whether transmitting the measuring results to the external mobile device or server via the wireless network. When the wireless transmission button is pressed, the weighing scale 100 transmits the measuring results to the external mobile device or server, otherwise the transmission of the measuring results is not performed. The power button is used to control whether energizing the weighing scale 100 or not.

When the power button is pressed, the weighing scale 100 is powered on, otherwise the weighing scale 100 is not powered. The height display button is used to provide a choice for the subject about whether measuring and displaying the height thereof. A default state of the height display button indicates to measure and display the height. When the height display button is pressed, the height measurement and display are not performed.

Figure 4:
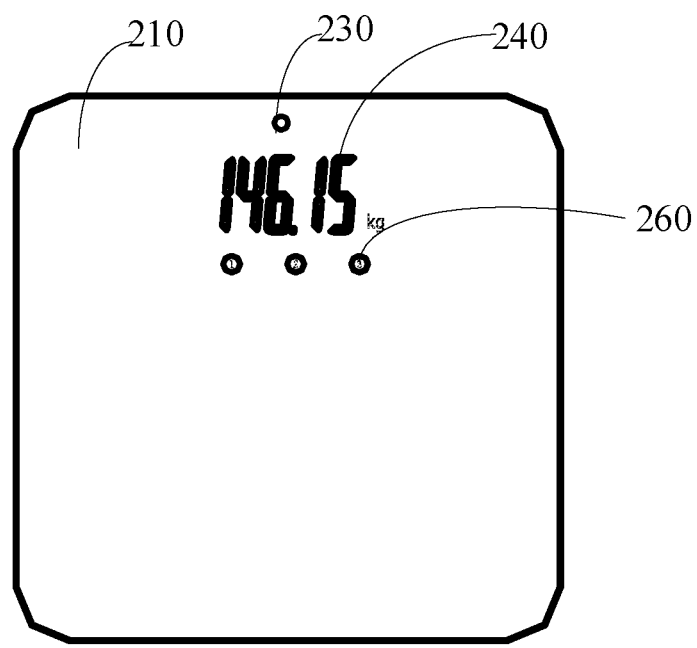
FIG. 4 is a top view of a scale body of a weighing scale in accordance with a second embodiment.
Figure 5:
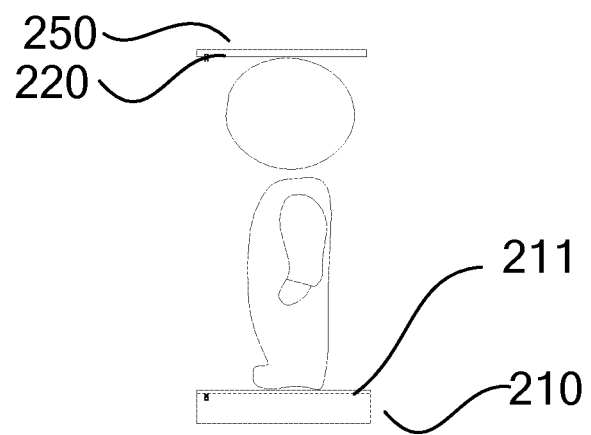
FIG. 5 is a schematic view of a weighing scale of FIG. 4 in a using status.
Figure 6:
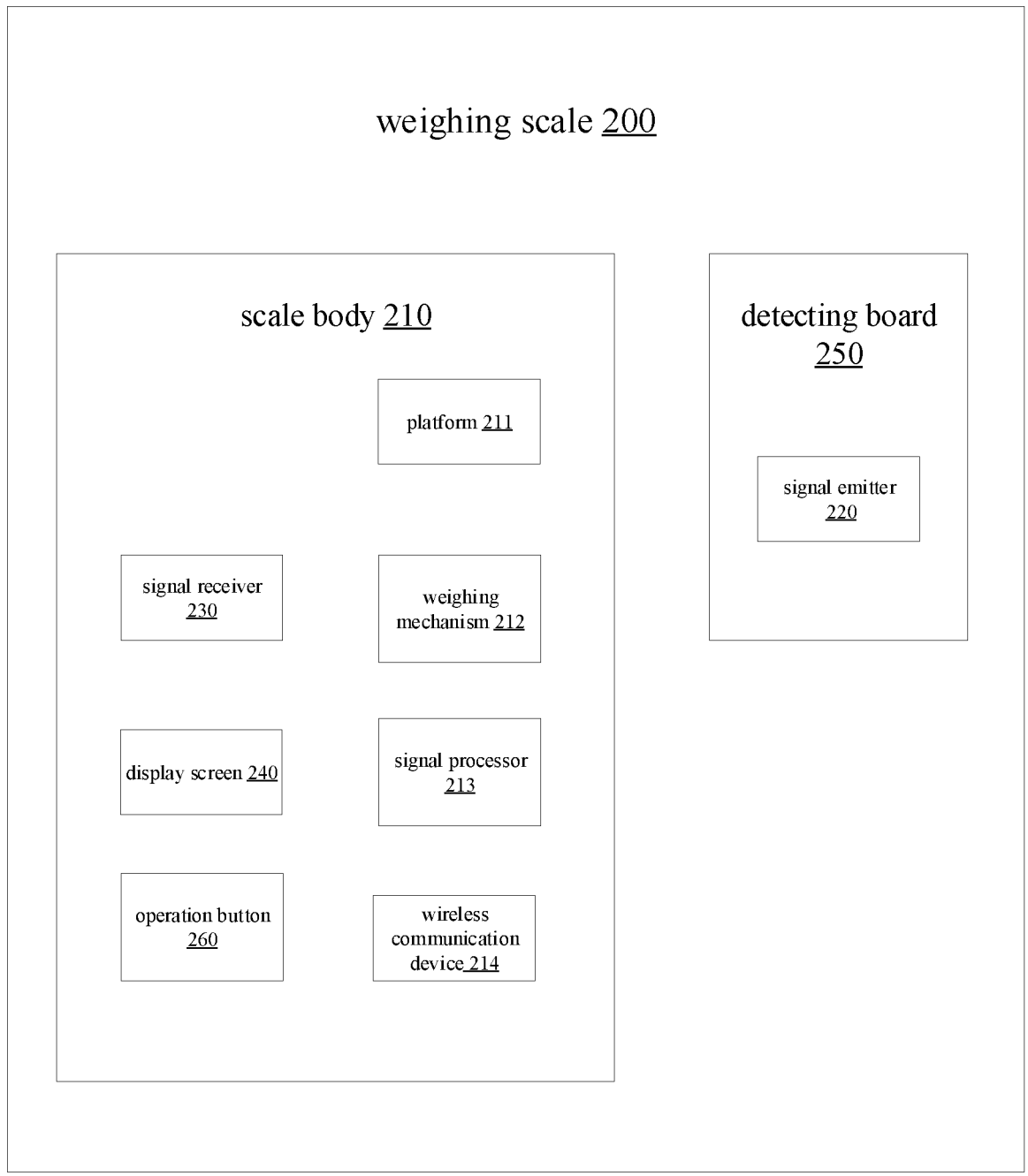
FIG. 6 is a block diagram of a weighing scale of FIG. 5.

Referring to FIGS. 4 to 6, a weighing scale 200 according to a second embodiment is provided. In this embodiment, the weighing scale 200 includes a scale body 210 and a detecting board 250.

The scale body 210 includes a platform 211. The platform 211 can be in contact with feet of a subject.

The detecting board 50 is separated from the scale body 10, and is used to abut against a top head of the subject. In this embodiment, the detecting board 50 is provided with a signal emitter 220. The signal emitter 220 is used to emit a signal for measuring a height of the subject.

The scale body 210 further includes a weighing mechanism 212, a signal receiver 230, a signal processor 213, a wireless communication device 214, and a display screen 240.

The weighing mechanism 212 is used to weigh a weight of the subject.

The signal receiver 230 is used to receive the height measuring signal transmitted by the signal emitter 220. When measuring, the subject steps on the platform 211 and holds the detecting board 250 abutting against the top head thereof, so that the signal emitted by the signal emitter 220 can be received by the signal receiver 230.

The signal processor 213 is electrically connected to the signal receiver 230, the weighing mechanism 212, the wireless communication device 214, and the display screen 240, respectively. The signal processor 213 processes data transmitted by the signal emitter 220 and the signal receiver 230 to obtain height data of the subject, processes data transmitted by the weighing mechanism 212 to obtain weight data of the subject, and transmits the height data and the weight data to the display screen 240.

The wireless communication device 214 is used to interact with an external mobile device or server via a wireless network. The signal processor 213 further transmits the height data and the weight data to the external mobile device or server for storage via the wireless communication device 214.

The display screen 240 receives and displays the processed weight and height data transmitted by the signal processor 213.

In this embodiment, the scale body 210 can be further provided with operation buttons 260. The operation buttons 260 and the display screen 240 are both located on the platform 211. The operation buttons 260 are located at one side of the displaying screen 240. The operation buttons 260 can be at least one selected from a group consisting of a lock button, a voice broadcast button, a wireless transmission button, a power button, and a height display button.

The aforementioned weighing scale 200 includes the scale body 210 and the detecting board 250 separated from the scale body 210. The detecting board 250 is provided with the signal emitter 220. The scale body 210 includes the signal receiver 230, the weighing mechanism 212, the signal processor 213, the wireless communication device 214, and the display screen 240. The signal emitter 220 transmits the height measuring signal. The height measuring signal is received by the signal receiver 230. The wireless communication device 214 interacts with the external mobile device or server via the wireless network. The signal processor 213 is electrically connected to the signal receiver 230, the weighing mechanism 212, the wireless communication device 214 and the display screen 240, respectively. The signal processor 213 processes the data of the signal emitter 220, the signal receiver 230, the weighing mechanism 212, and transmits the processed data to the display screen 240 for display and further transmits the processed data to the external mobile device or server for storage via the wireless communication device 214. In this way, an accurate weight and height data of the subject can be obtain via the processing of the signal processor on the received signal, which avoids manually height measurement via mechanical means, and ensures an accuracy of a measuring result. The measuring result can be visually displayed on the display screen and can be transmitted to the external mobile device or server for storage via the wireless communication device, thereby avoiding manually record of the measuring result, which saves time and labor, and is convenient and practical.

It should be understood that according to design requirements, the signal receiver 230 can be located on the detecting board 250, while the signal emitter 220 can be located on the scale body 210. When measuring, the subject steps on the platform 211 and holds the detecting board 250 abutting against the top head thereof, the signal transmitted by the signal emitter 220 can be received by the signal receiver 230, and a height parameter can be obtained by calculating according to a propagation time and a propagation speed of the signal. The propagation speed of the signal is constant for a certain signal emitter 220.

Similarly, in alternative embodiment, the signal emitter 220 and the signal receiver 230 can be both located on the detecting board 250. When measuring, the subject steps on the platform 211 and holds the detecting board 250 abutting against the top head thereof. The signal emitter 220 transmits a height measuring signal. The height measuring signal is reflected by the platform 211. The reflected height measuring signal is received by the signal receiver 230. The height parameter of the subject can be obtained by calculating according to a propagation time and a propagation speed of the signal. The propagation speed of the signal is constant for a certain signal emitter 220.

The technical features of the above embodiments can be arbitrarily combined. For the sake of brevity of description, all possible combinations of the technical features in the above embodiments are not described. However, as long as there is no collision in the combination of these technical features, it should be considered as the scope described in this specification.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A weighing scale, comprising:
   a scale body comprising a platform in contact with feet of a subject,
   wherein the scale body is provided with a signal emitter and a signal receiver;
   the signal emitter and the signal receiver are configured, when a detecting board, which is separated from the scale body and capable of moving towards or away from the platform, abuts against a top head of the subject and reflects a signal emitted from the signal emitter to the signal receiver, to measure a distance between the platform and the detecting board; the scale body further comprises a weighing mechanism, a signal processor, a wireless communication device, and a display screen; the wireless communication device is configured to interact with an external mobile device or server via a wireless network; the signal processor is configured to process data of the signal emitter, the signal receiver, and the weighing mechanism, transmit processed data to the display screen for display, and transmit the processed data to the external mobile device or server via the wireless communication device.

2. The weighing scale according to claim 1, further comprising an acoustic indicator electrically connected to the signal processor and configured to broadcast the processed data transmitted from the signal processor in voice.

3. The weighing scale according to claim 1, wherein the scale body is provided with at least one operation buttons, the operation buttons and the display screen are located on the platform, and the operation buttons are on one side of the display screen.

4. The weighing scale according to claim 3, wherein the operation button is at least one selected from a group consisting of a lock button, a voice broadcast button, a wireless transmission button, a power button, and a height display button.

5. The weighing scale according to claim 1, wherein the signal emitter is at least one selected from a group consisting of a laser emitter, an LED emitter, an infrared emitter, an ultrasonic transmitter, an electromagnetic wave transmitter, and a millimeter wave transmitter.

6. The weighing scale according to claim 1, wherein the wireless communication device is at least one selected from a group consisting of a WiFi device, a Bluetooth device, a ZigBee device, a Zwave device, a WLAN device, a GSM device, a 2G device, a 3G device, a 4G device, and a 5G devices.

7. The weighing scale according to claim 1, further comprising a power supply device configured to supply power to the weighing scale.

8. The weighing scale according to claim 1, wherein the signal processor comprises a microprocessor, the display screen is an LCD or a digital display screen, and the detecting board is a plastic plate or a cell phone.

* * * * *